(12) United States Patent
Lee et al.

(10) Patent No.: US 11,287,524 B2
(45) Date of Patent: Mar. 29, 2022

(54) SYSTEM AND METHOD FOR FUSING SURROUNDING V2V SIGNAL AND SENSING SIGNAL OF EGO VEHICLE

(71) Applicants: HYUNDAI MOTOR COMPANY, Seoul (KR); KIA MOTORS CORPORATION, Seoul (KR)

(72) Inventors: Woo Young Lee, Gunsan-si (KR); Hoon Lee, Gunpo-si (KR); Ji Eun Won, Hwaseong-si (KR); Uk Il Yang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 478 days.

(21) Appl. No.: 16/534,393

(22) Filed: Aug. 7, 2019

(65) Prior Publication Data
US 2020/0183002 A1 Jun. 11, 2020

(30) Foreign Application Priority Data
Dec. 11, 2018 (KR) .................. 10-2018-0159307

(51) Int. Cl.
*G01S 13/93* (2020.01)
*G01S 13/58* (2006.01)
*H04W 4/46* (2018.01)
*G08G 1/16* (2006.01)
*G01S 13/931* (2020.01)

(52) U.S. Cl.
CPC .......... *G01S 13/931* (2013.01); *G01S 13/58* (2013.01); *G08G 1/166* (2013.01); *H04W 4/46* (2018.02); *G01S 2013/9322* (2020.01)

(58) Field of Classification Search
CPC ........ G01S 13/58; G01S 13/726; G01S 13/86; G01S 13/867; G01S 13/931; G01S 19/14; G01S 19/42; G01S 19/52; G01S 2013/9316; G01S 2013/932; G01S 2013/9322;
(Continued)

(56) References Cited

U.S. PATENT DOCUMENTS 9,802,614 B1 * 10/2017 Yoon ................. B60W 30/0956
2005/0225457 A1 * 10/2005 Kagawa ............... G08G 1/0965
340/995.13
(Continued)

*Primary Examiner* — Sisay Yacob
(74) *Attorney, Agent, or Firm* — McDonnell Boehnen Hulbert & Berghoff LLP

(57) ABSTRACT

A method of fusing a surrounding vehicle-to-vehicle (V2V) signal and a sensing signal of an ego vehicle includes calculating a position of a surrounding target vehicle and a velocity of the target vehicle based on the ego vehicle using global positioning system (GPS)/vehicle velocity information detected in the ego vehicle and GPS/vehicle velocity information included in a V2V signal detected in the target vehicle, extracting a sensor signal within a predetermined specific distance error from a position of the target vehicle relative to the ego vehicle of the V2V signal as a sensor information candidate group corresponding to the V2V signal, adaptively using a constant velocity model, a kinematic model or a dynamic model according to the extracted situation, and comparing the V2V signal with information on an object tracked using both the sensing signal and the V2V signal to estimate a position and velocity error of the V2V signal.

11 Claims, 6 Drawing Sheets

(58) Field of Classification Search
CPC ......... G01S 2013/93271; G08G 1/166; H04W 4/027; H04W 4/38; H04W 4/46
See application file for complete search history.

(56) References Cited

U.S. PATENT DOCUMENTS

2007/0016372 A1* 1/2007 Browne ............... G01C 21/005
                                                            701/469
2017/0131719 A1* 5/2017 Micks ............... B60W 60/0027

* cited by examiner

SYSTEM AND METHOD FOR FUSING SURROUNDING V2V SIGNAL AND SENSING SIGNAL OF EGO VEHICLE

CROSS REFERENCE TO RELATED APPLICATION

This application claims the benefit of Korean Patent Application No. 10-2018-0159307, filed on Dec. 11, 2018, which is hereby incorporated by reference as if fully set forth herein.

BACKGROUND

Field of Disclosure

The present disclosure relates to a system and method for fusing a surrounding V2V signal and a sensing signal of an ego vehicle, and more particularly, to a system and method for fusing a surrounding V2V signal and a sensing signal of an ego vehicle, which are capable of generating a sensing signal having improved accuracy and reliability using both the sensing signal of the ego vehicle and the V2V signal when the V2V signal is present around the ego vehicle.

Discussion of the Related Art

In order to realize a smart car, accurate vehicle location, precise positioning technology and digital mapping technology, an advanced driver-assistance system (ADAS) for checking a driving status of a driver, a sensor used for the ADAS and sensor fusion technology are very important.

Sensor fusion is technology for reliably recognizing a situation around a vehicle through information fusion based on sensor signals output from a front radar, a front camera, and a side radar mounted in the vehicle, and sensor fusion technology of the front radar and the front camera have been applied to an advanced driver-assistance system (ADAS) such as a smart cruise control (SCC) system and a forward collision avoidance (FCA) system.

Meanwhile, a vehicle-to-everything (V2X) system for providing a safe and convenient service based on vehicle-to-vehicle (V2V) and vehicle-to-infrastructure (V2I) communication has been developed. V2V is technology for sharing a vehicle state (a vehicle velocity, a brake, a turn signal, etc.) and GPS position information (V2V signal) with a neighboring vehicle to warn a driver about collision, and V2I is technology for receiving forward construction or accident or traffic signal information from infrastructure while a vehicle travels and selectively providing safe/convenient driving information to a driver.

For example, Korean Patent Laid-Open Publication No. 10-2014-0033277 (Mar. 18, 2014) discloses a V2V communication based vehicle identification device and method of more accurately identifying neighboring vehicles, by performing probabilistic analysis using radar detection information and GPS information through vehicle communication and identifying neighboring vehicles based on probabilistic analysis.

In addition, Korean Patent Registration No. 10-1840469 (Mar. 14, 2018) discloses a collision risk warning apparatus and method using V2V communication capable of detecting a dangerous object which is not detected by an ego vehicle due to vehicles parked on a road or intersections and buildings by receiving collision risk information from a preceding vehicle through V2V communication and further reducing the risk of collision by detecting a dangerous object such as a stone and warning a driver about a collision risk situation.

However, in such sensor fusion technology, a fused sensor signal having higher accuracy than an individual sensor signal is generated through fusion of signals output from individual sensors. However, the detection areas of the individual sensors are limited and information measurable by the individual sensors may be limited (data on a target object and the state of the target object cannot be checked).

In addition, a V2V signal may have a wider detection area than the sensors of an ego vehicle and include a variety of information such as data on a target object or the state of the target object. However, since all vehicles traveling on a road do not support V2V communication, the ego vehicle alone cannot use the V2V signal.

SUMMARY

Accordingly, the present disclosure is directed to a system and method for fusing a surrounding V2V signal and a sensing signal of an ego vehicle that substantially obviate one or more problems due to limitations and disadvantages of the related art.

An object of the present disclosure is to provide a system and method for fusing a surrounding V2V signal and a sensing signal of an ego vehicle, which are capable of generating a sensing signal having improved accuracy and reliability using both the sensing signal of the ego vehicle and the V2V signal when the V2V signal is present around the ego vehicle.

Another object of the present disclosure is to provide a system and method for fusing a surrounding V2V signal and a sensing signal of an ego vehicle, which are capable of improving accuracy and reliability of information on an object located around the vehicle using an error estimated based on the surrounding V2V signal and the sensing signal of the ego vehicle even in a situation in which an object is detected by the sensing signal alone or in a situation in which an object is detected by the V2V signal alone.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a system for fusing a surrounding vehicle-to-vehicle (V2V) signal and a sensing signal of an ego vehicle includes a sensing unit configured to detect global positioning system (GPS)/vehicle velocity information from one or more sensors mounted in the ego vehicle, a V2V communication unit configured to transmit information on the ego vehicle detected by the sensing unit to one or more target vehicles within a predetermined area or to receive a V2V signal from a target vehicle within a predetermined area of the ego vehicle, and a controller configured to perform control to fuse a sensing signal detected by the sensing unit and the V2V signal received and output by the V2V communication unit to estimate an error based on fused object information, to correct the sensing signal based on the estimated error, and to correct the V2V signal based on the estimated error.

In another aspect of the present disclosure, a method of fusing a surrounding vehicle-to-vehicle (V2V) signal and a sensing signal of an ego vehicle includes calculating a position of a surrounding target vehicle and a velocity of the target vehicle based on the ego vehicle using global positioning system (GPS)/vehicle velocity information detected in the ego vehicle and GPS/vehicle velocity information included in a V2V signal detected in the target vehicle, extracting a sensor signal within a predetermined specific distance error from a position of the target vehicle relative to the ego vehicle of the V2V signal as a sensor information candidate group corresponding to the V2V signal, adaptively using a constant velocity model, a kinematic model or a dynamic model according to the extracted situation, and comparing the V2V signal with information on an object tracked using both the sensing signal and the V2V signal to estimate a position and velocity error of the V2V signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
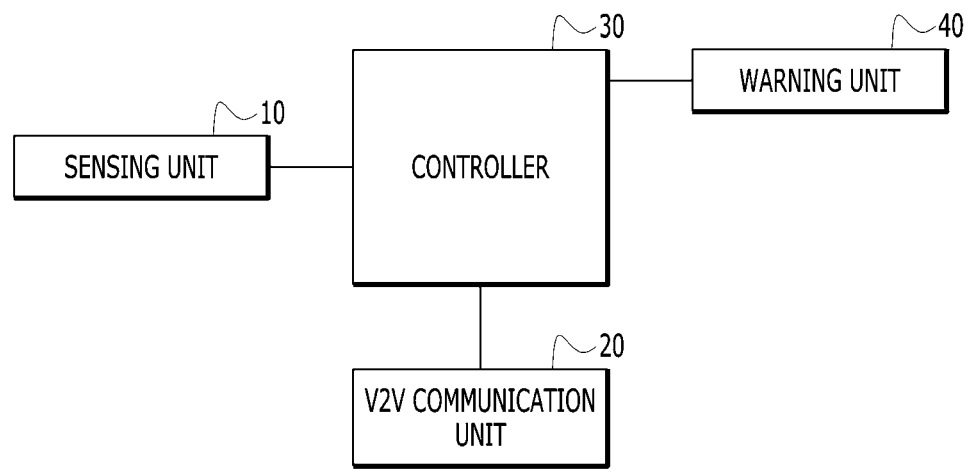
FIG. 1 is a block diagram showing a system for fusing a surrounding V2V signal and a sensing single of an ego vehicle according to an embodiment of the present disclosure.

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, the configuration and operation of a system for fusing a surrounding V2V signal and a sensing single of an ego vehicle according to an embodiment of the present disclosure will be described with reference to the accompanying drawings.

Figure 2:
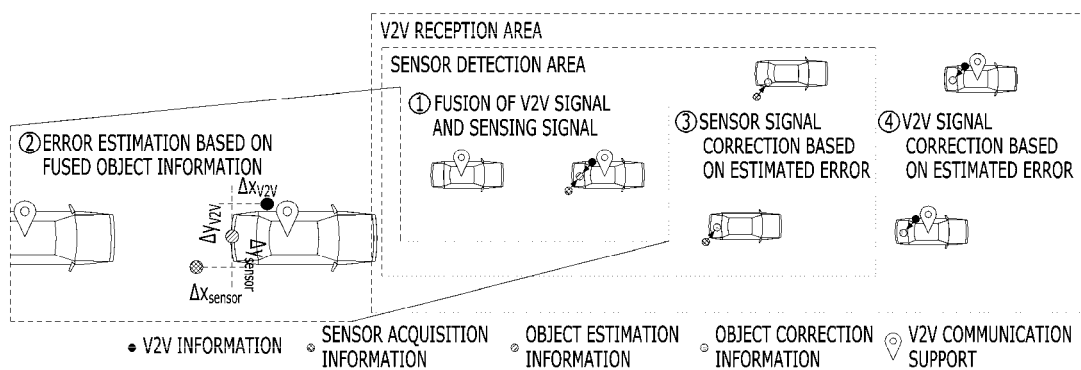
FIG. 2 is a view illustrating general operation of a system for fusing a surrounding V2V signal and a sensing single of an ego vehicle according to an embodiment of the present disclosure.

FIG. 1 is a block diagram showing a system for fusing a surrounding V2V signal and a sensing single of an ego vehicle according to an embodiment of the present disclosure, and FIG. 2 is a view illustrating general operation of a system for fusing a surrounding V2V signal and a sensing single of an ego vehicle according to an embodiment of the present disclosure.

Referring to FIGS. 1 and 2, the system for fusing the surrounding V2V signal and the sensing single of an ego vehicle according to the present disclosure includes a sensing unit 10 for detecting GPS/vehicle velocity information from one or more sensors mounted in an ego vehicle, a V2V communication unit 20 for transmitting ego vehicle information detected by the sensing unit 10 to one or more target vehicles within a predetermined area or receiving V2V signals from the target vehicles in the predetermined area of the ego vehicle, a controller 30 for performing control to estimate an error based on object information obtained by fusing a sensing signal detected and output by the sensing unit 10 and V2V signals received and output by the V2V communication unit 20, to correct the sensing signal based on the estimated error, to correct the V2V signals based on the estimated error, to determine whether a collision-risk object is present within a predetermined traveling range of the ego vehicle and to output a warning signal to a driver depending on whether the collision-risk object is present, and a warning unit 40 for outputting a predetermined warning signal to the ego vehicle under control of the controller 30.

The sensing unit 10 may include a combination of at least one sensor selected from a front radar and a front camera provided at a front side of the vehicle, a side radar provided at the lateral side of the vehicle and a yaw rate sensor.

Figure 3:
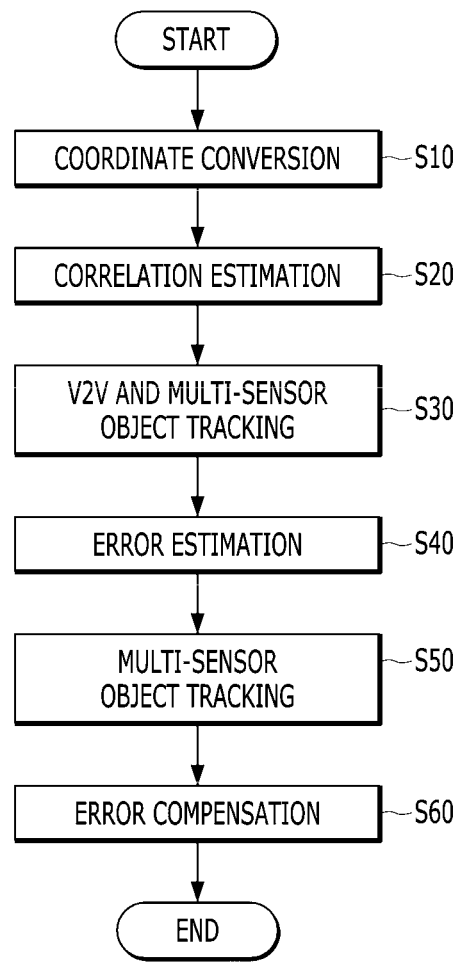
FIG. 3 is a flowchart illustrating a method of fusing a surrounding V2V signal and a sensing single of an ego vehicle according to an embodiment of the present disclosure.

FIG. 3 is a flowchart illustrating a method of fusing a surrounding V2V signal and a sensing single of an ego vehicle according to an embodiment of the present disclosure.

Referring to FIG. 3, the method of fusing the surrounding V2V signal and the sensing signal of an ego vehicle according to the embodiment of the present disclosure may include coordinate conversion S10, correlation estimation S20, V2V and multi-sensor object tracking S30, error estimation S40, multi-sensor object tracking S50 and error compensation S60, which will be described below.

Coordinate Conversion S10

The controller 30 calculates the position and velocity of another (counterpart) vehicle based on the ego vehicle using GPS/vehicle velocity information detected by the sensing unit 10 of the ego vehicle and GPS/vehicle velocity information included in a V2V signal detected by the target vehicle.

Correlation Estimation S20

Figure 4:
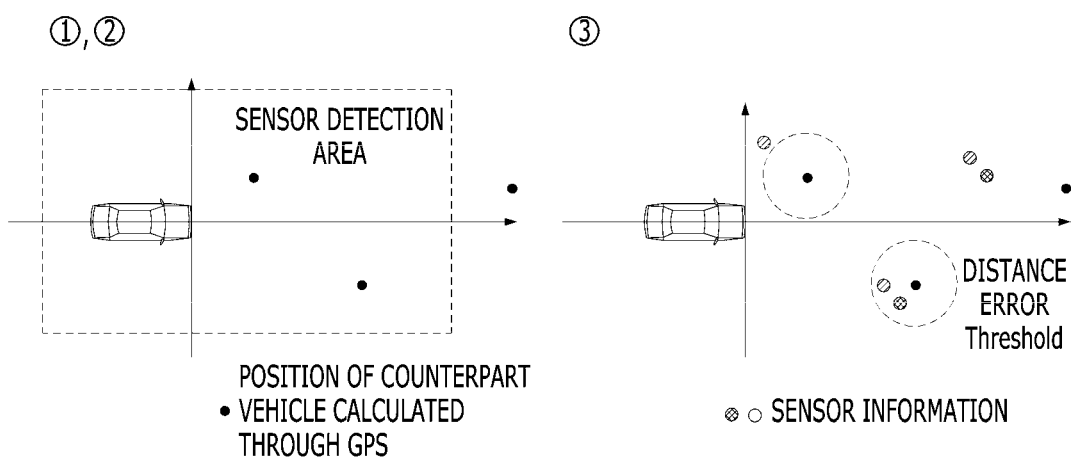
FIGS. 4, 5A, 5B, and 5C are views illustrating correlation estimation operation in a procedure of fusing a surrounding V2V signal and a sensing single of an ego vehicle according to an embodiment of the present disclosure.

As shown in FIG. 4, the controller 30 extracts a sensor signal within a specific distance (Euclidean distance) error based on the position of the target vehicle relative to the ego vehicle of the extracted V2V signal as a sensor information candidate group corresponding to the V2V signal.

Here, the specific distance is a design factor which may vary according to an average error of the sensing signal, GPS reception situation, etc. For example, a low value may be used in a sensor having high accuracy, a high value may be used in a downtown area, and a value which is inversely proportional to the number of reception GPS satellites may be used.

That is, as shown in FIGS. 3 to 6, the controller 30 determines whether information detected based on the position of the target vehicle relative to the ego vehicle is a V2V signal in a predetermined sensor detection area 10, that is, in a Field of View (FoV) (S21).

Upon determining that the V2V signal is detected within the predetermined sensor detection area 10 in step S21, the controller 30 calculates similarity with a GPS signal using a sensor signal extracted from the sensor information candidate group, and the vehicle velocity, yaw rate, and a path history of the V2V signal, selects the sensor signal and the V2V signal of the same target vehicle based on the calculated similarity, and performs sensor fusion operation.

That is, the controller 30 determines whether a difference between the velocity of the V2V and the velocity detected by the sensing unit 10 is less than a predetermined threshold velocity (S22). Upon determining that the difference between the velocity of the V2V and the velocity detected by the sensing unit 10 is less than the predetermined threshold velocity in step S22, the controller 30 determines whether a difference between a yaw rate angle of the V2V and a yaw rate angle detected by the sensing unit 10 is less than a predetermined threshold yaw rate angle (S23), thereby determining similarity based on the velocity and the yaw rate.

Figure 5A:
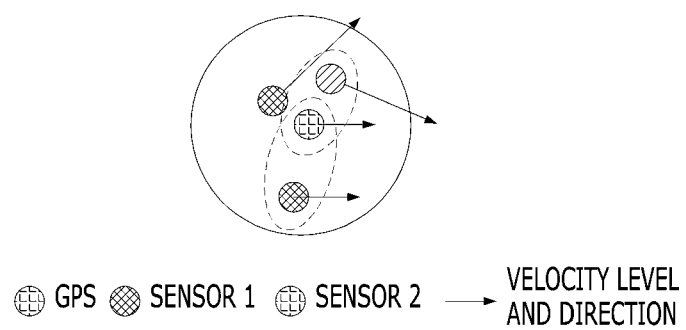

As shown in FIG. 5A, if similarity is determined based on the velocity and the yaw rate, Equation 1 below may be used.

$$V_{V2V} - V_{sensor} < V_{TN}$$

$$\Psi_{V2V} - \Psi_{sensor} < \Psi_{TN} \quad \text{[Equation 1]}$$

$V_{V2V}$: velocity from V2V $V_{sensor}$: velocity from sensor $V_{TN}$: velocity threshold $\Psi_{V2V}$: yaw angle from V2V $\Psi_{sensor}$: yaw angle from sensor $\Psi_{TN}$: yaw angle from threshold At this time, upon determining that the difference between the yaw rate angle of the V2V and the yaw rate angle detected by the sensing unit 10 is less than the predetermined threshold yaw rate angle in step S23, the controller 30 determines whether similarity is found based on the path history (S24).

Figure 5B:
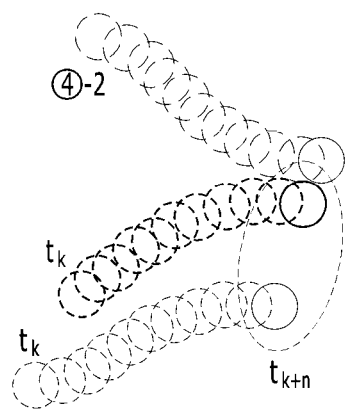

When similarity is determined based on the path history, as shown in FIG. 5B, the path history acquired by V2V and the path history acquired by the sensing unit 10 mounted in the ego vehicle may be compared to determine similarity.

At this time, upon determining that similarity is found based on the path history in step S24, the controller 30 determines whether similarity is found based on a navigation map (S25).

Figure 5C:
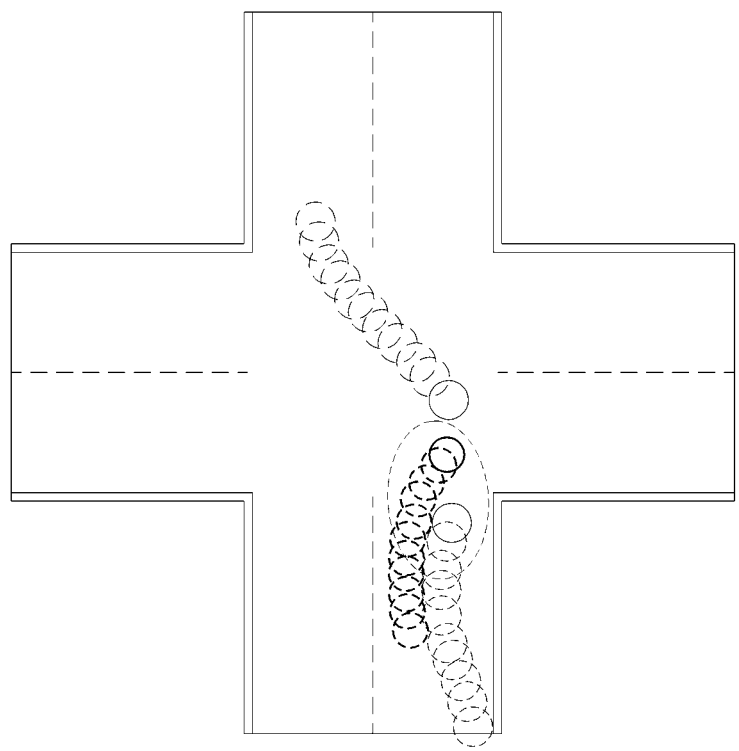
Figure 6:
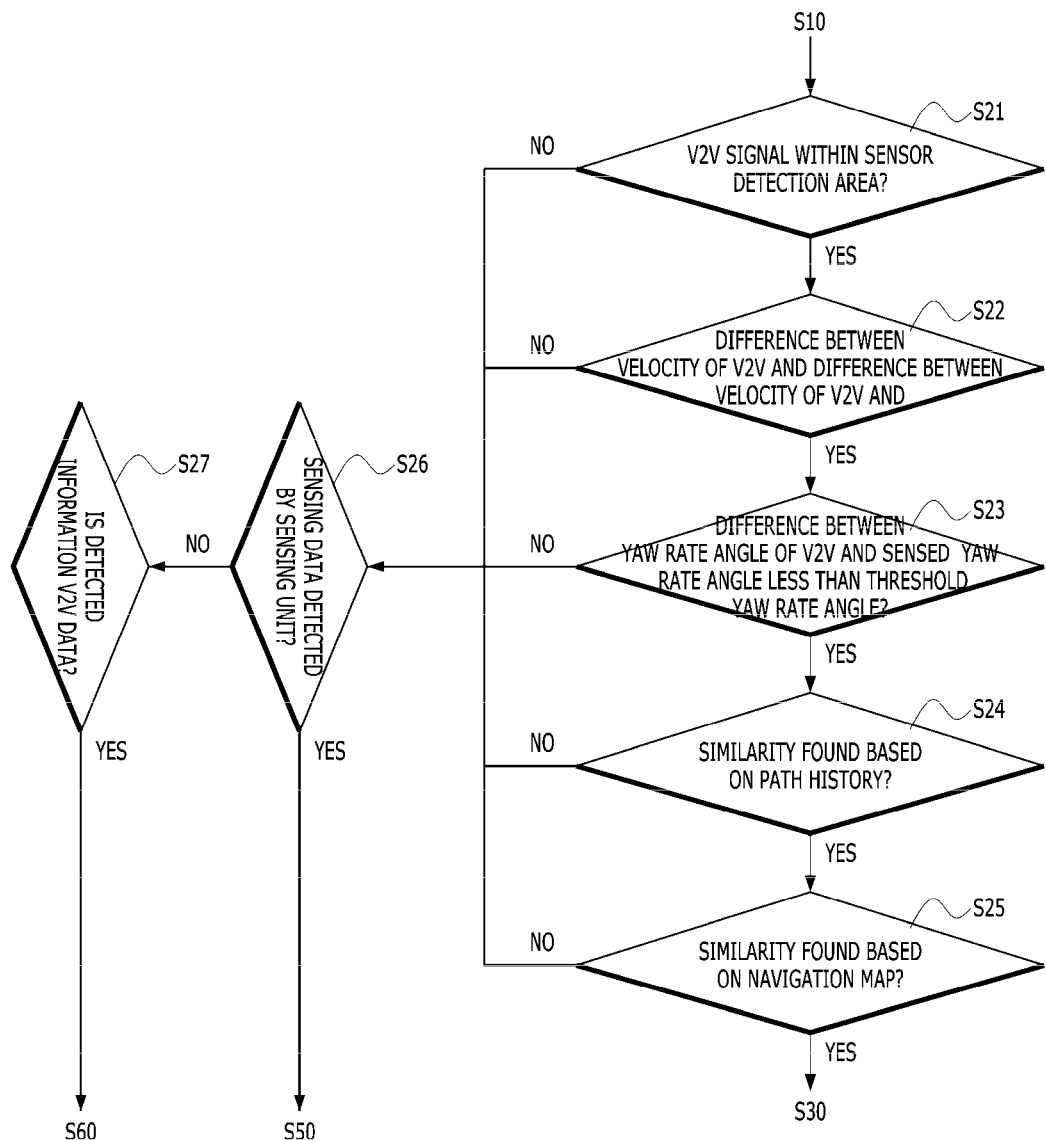
FIG. 6 is a flowchart illustrating correlation estimation operation in a procedure of fusing a surrounding V2V signal and a sensing single of an ego vehicle according to an embodiment of the present disclosure.

When similarity is determined based on the navigation map, as shown in FIG. 5C, similarity may be determined through the vehicle velocity, the yaw rate and the path history of the V2V signal based on the navigation map.

At this time, upon determining that similarity is found based on the navigation map in step S25, V2V and multi-sensor object tracking S30 is performed.

Meanwhile, upon determining that the V2V signal is not detected within the predetermined sensor detection area 10 in step S21, upon determining that the difference between the velocity of the V2V and the velocity detected by the sensing unit 10 is not less than the predetermined threshold velocity in step S22, upon determining that the difference between the yaw rate angle of the V2V and the yaw rate angle detected by the sensing unit 10 is not less than the predetermined threshold yaw rate angle in step S23, upon determining that similarity is not found based on the path history in step S24, or upon determining that similarity is found based on the navigation map in step S25, whether the detected information is the sensing data detected by the sensing unit 10 mounted in the ego vehicle is determined (S26).

At this time, upon determining that the detected information is the sensing data detected by the sensing unit 10 mounted in the ego vehicle in step S26, multi-sensor object tracking S50 is performed. In contrast, upon determining that the detected information is not the sensing data detected by the sensing unit 10 mounted in the ego vehicle in step S26, the controller 30 determines that the detected information is V2V data (S27).

At this time, upon determining that the detected information is V2V data, the controller 30 performs error compensation S60.

That is, when an object is detected by the V2V signal alone, the controller 30 performs a step of error composition S60.

Also, when an object is detected by the sensing signal alone, the controller 30 performs a step of multi-sensor object tracking S50.

Also, when an object is detected by the sensing signal of the ego vehicle and the V2V signal, the controller 30 performs a step of V2V and multi-sensor object tracking S30.

V2V & Multi-Sensor Object Tracking S30

Subsequently, the controller 30 may adaptively use a constant velocity model, a kinematic model or a dynamic mode according to circumstance.

Figure 7:
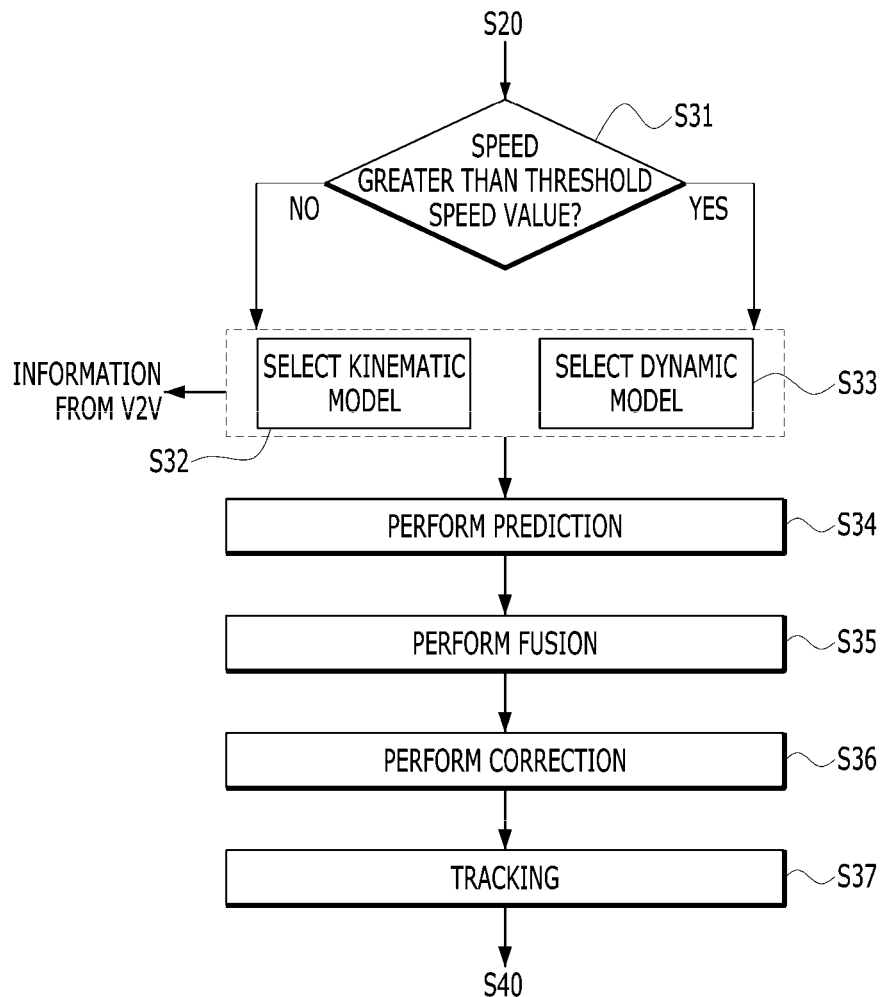
FIG. 7 is a flowchart illustrating V2V and multi-sensor object tracking operation in a procedure of fusing a surrounding V2V signal and a sensing single of an ego vehicle according to an embodiment of the present disclosure.

That is, as shown in FIG. 7, the controller 30 determines whether the velocity of the target vehicle is greater than a predetermined threshold velocity value (S31).

At this time, upon determining that the velocity of the target vehicle is not greater than the predetermined threshold velocity value in step S31, low-velocity driving is recognized and the kinematic model is applied and, upon determining that the velocity of the target vehicle is greater than the predetermined threshold velocity value in step S31, high-velocity driving is recognized and the dynamic model is applied (S32 and S33).

Here, if both the sensing signal and the V2V signal are present, the dynamic model may be used when the counterpart (target) vehicle travels at a high velocity and the kinematic model may be used when the target vehicle (target) travels at a low velocity. Here, through the V2V signal, specification information of the counterpart (target) vehicle may be acquired.

Since detection of the sensing signal using these models may represent the behavior of the vehicle better than the constant velocity model, prediction accuracy of motion of the counterpart (target) vehicle is improved.

Subsequently, the controller 30 performs prediction based on the selected model (S34) and fuses the V2V and the sensing signal detected by the sensing unit 10 mounted in the ego vehicle (S35).

Subsequently, the controller 30 corrects the fused sensing signal (S36) and performs tracking (S37).

In the embodiment of the present disclosure, as the model for V2V and multi-sensor object tracking, a general constant velocity model used in sensor fusion using only the sensor attached to the ego vehicle may be obtained through Equation 2 below:

$$X = X_0 + V_x t \quad Y = Y_0 + V_y t \quad \text{[Equation 2]}$$

where, X denotes a termination position, Y denotes a lateral position, and $V_x t$ and $V_y t$ respectively denote a terminal velocity and a lateral velocity.

In addition, as the model for V2V and multi-sensor object tracking, a dynamic model usable in sensor fusion using the V2V signal and the sensor attached to the ego vehicle may be obtained through Equation 3 below:

$$\begin{bmatrix} \dot{y} \\ \ddot{y} \\ \dot{\psi} \\ \ddot{\psi} \end{bmatrix} = \begin{bmatrix} 0 & 1 & 0 & 0 \\ 0 & -\dfrac{2C_{\alpha f} + 2C_{\alpha r}}{mV_x} & 0 & -V_x - \dfrac{2C_{\alpha f}l_f + 2C_{\alpha r}l_r}{mV_x} \\ 0 & 0 & 0 & 1 \\ 0 & -\dfrac{2l_f C_{\alpha f} + 2l_r C_{\alpha r}}{I_z V_x} & 0 & -\dfrac{2l_f^2 C_{\alpha f} + 2l_r^2 C_{\alpha r}}{I_z V_x} \end{bmatrix} + \begin{bmatrix} 0 \\ \dfrac{2C_{\alpha f}}{m} \\ 0 \\ \dfrac{2l_f C_{\alpha f}}{I_z} \end{bmatrix} \delta \quad \text{[Equation 3]}$$

y: Distance of the center of gravity of the vehicle from the lane
ψ: Orientation error of the vehicle with respect to the road
$C_{\alpha f}$: Cornering stiffness of each front tire
$C_{\alpha r}$: Cornering stiffness of each rear tire
m: Curb weight
$V_x$: Longitudinal velocity
$l_f$: Distance from center of gravity to front tire
$l_r$: Distance from center of gravity to rear tire
$I_z$: Moment of inertia In addition, as the model for V2V and multi-sensor object tracking, a kinematic model usable in sensor fusion using the V2V signal and the sensor attached to the ego vehicle may be obtained through Equation 4 below:

$$\dot{X} = v_{cos}(\Psi + \beta)$$
$$\dot{Y} = v_{sin}(\Psi + \beta) \quad \text{[Equation 4]}$$
$$\dot{\Psi} = \dfrac{v_{cos}(\beta)}{l_f + l_r}(\tan(\delta_f) - \tan(\delta_r))$$

where $\dot{x}$ denotes longitudinal velocity, $\dot{y}$ denotes lateral velocity, ψ denotes a yaw rate angle, β denotes a vehicle slip angle, α denotes cornering stiffness, δ denotes the moment of inertia, m denotes mass, and $l_f$ and $l_r$ respectively denote distances from the front side and the rear side to the center of gravity.

Error Estimation S40

The controller 30 may compare the V2V signal with information on the object tracked using both the V2V signal and the sensing signal detected by the sensing unit 10 mounted in the ego vehicle to estimate the position and velocity error of the V2V signal. Specifically, the error may be estimated based on adaptive filtering such as recursive least squares filtering or iterative closest point filtering. The estimated error may be used as a correction value when V2V information alone is detected.

In addition, by applying the same method as the V2V signal, the controller 30 may compare the sensing signal with the information on the object tracked using both the V2V signal and the sensing signal detected by the sensing unit 10 mounted in the ego vehicle to estimate the position and velocity error of the sensing signal.

Multi-Sensor Object Tracking S50

The controller 30 detects the sensing signal alone based on the constant velocity model.

Error Compensation S60

The controller 30 compensates for the error by applying the position and velocity error of the V2V signal and the sensing signal detected by the sensing unit 10 mounted in the ego vehicle estimated in error estimation S40. In the embodiment of the present disclosure, the error is corrected by subtracting the estimated error value from each signal value.

As described above, according to the system for fusing the surrounding V2V signal and the sensing signal of the ego vehicle, it is possible to overcome limitations due to limited detection of individual sensors mounted in the conventional ego vehicle and to check data on the target object and the state of the target object. Therefore, it is possible to achieve important technological progress in implementation of a smart car.

According to the system and method for fusing the surrounding V2V signal and the sensing signal of the ego vehicle of the present disclosure, it is possible to generate a sensing signal with improved accuracy and reliability using both the V2V signal and the sensing signal of the ego vehicle when the V2V signal is present around the ego vehicle.

According to the present disclosure, it is possible to improve accuracy and reliability of information on an object located around the vehicle using an error estimated based on the surrounding V2V signal and the sensing signal of the ego vehicle even in a situation in which an object is detected by the sensing signal alone (the object is not supported by V2V communication) or in a situation in which an object is detected by the V2V signal alone (the object is not detected by the sensor).

According to the present disclosure, it is possible to overcome limitations due to limited detection of individual sensors mounted in the conventional ego vehicle and to check data on the target object and the state of the target object.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of fusing a surrounding vehicle-to-vehicle (V2V) signal and a sensing signal of an ego vehicle, the method comprising:
    calculating a position of a surrounding target vehicle and a velocity of the target vehicle based on the ego vehicle using global positioning system (GPS)/vehicle velocity information detected in the ego vehicle and GPS/vehicle velocity information included in a V2V signal detected in the target vehicle;
    extracting a sensor signal within a predetermined specific distance error from a position of the target vehicle relative to the ego vehicle of the V2V signal as a sensor information candidate group corresponding to the V2V signal;
    adaptively using a constant velocity model, a kinematic model or a dynamic model according to the extracted situation; and
    comparing the V2V signal with information on an object tracked using both the sensing signal and the V2V signal to estimate a position and velocity error of the V2V signal.

2. The method according to claim 1, further comprising, after the comparing step,
    detecting a sensor signal alone based on a constant velocity mode; and
    compensating for an error by applying the position and velocity error of the V2V signal and the sensing signal.

3. The method according to claim 1, wherein the extracting step includes:
    determining whether information detected based on a position of the target vehicle relative to the ego vehicle is the V2V signal within a predetermined sensor detection area; and
    calculating similarity with a GPS signal using a sensing signal extracted as a sensor information candidate group and a vehicle velocity, a yaw rate and a path history of the V2V signal when the V2V signal is detected within the sensor detection area and selecting the sensor signal and the V2V signal of the same target vehicle based on the calculated similarity.

4. The method according to claim 1, wherein the adaptively using a constant velocity model step includes:
    determining whether a velocity of the target vehicle is greater than a predetermined threshold velocity value, applying a kinematic model upon determining that the velocity of the target vehicle is not greater than the predetermined threshold velocity value, and applying a dynamic model upon determining that the velocity of the target vehicle is greater than the predetermined threshold velocity value; and
    performing prediction based on the selected model and fusing the V2V signal and the sensing signal.

5. A computer-readable recording medium having recorded thereon a program for executing the method according to claim 1.

6. A computer-readable recording medium having recorded thereon a program for executing the method according to claim 2.

7. A computer-readable recording medium having recorded thereon a program for executing the method according to claim 3.

8. A computer-readable recording medium having recorded thereon a program for executing the method according to claim 4.

9. A system for fusing a surrounding vehicle-to-vehicle (V2V) signal and a sensing signal of an ego vehicle, the system comprising:
    a sensing unit configured to detect global positioning system (GPS)/vehicle velocity information from one or more sensors mounted in the ego vehicle;
    a V2V communication unit configured to transmit information on the ego vehicle detected by the sensing unit to one or more target vehicles within a predetermined area or to receive a V2V signal from a target vehicle within a predetermined area of the ego vehicle; and
    a controller configured to perform control to fuse a sensing signal detected by the sensing unit and the V2V signal received and output by the V2V communication unit to estimate an error based on fused object information, to correct the sensing signal based on the estimated error, and to correct the V2V signal based on the estimated error.

10. The system according to claim 9, wherein the controller determines whether information detected based on a position of the target vehicle relative to the ego vehicle is the V2V signal within a predetermined sensor detection area, calculates similarity with a GPS signal using a sensor signal extracted as a sensing signal candidate group and a vehicle velocity, a yaw rate and a path history of the V2V signal when the V2V signal is detected within the sensor detection area, and selects the sensor signal and the V2V signal of the same target vehicle based on the calculated similarity.

11. The system according to claim 9, wherein the controller determines whether a velocity of the target vehicle is greater than a predetermined threshold velocity value, applies a kinematic model upon determining that the velocity of the target vehicle is not greater than the predetermined threshold velocity value, and applies a dynamic model upon determining that the velocity of the target vehicle is greater than the predetermined threshold velocity value.

* * * * *